United States Patent [19]

Candea

[11] Patent Number: 5,003,683
[45] Date of Patent: Apr. 2, 1991

[54] FORMING BORES IN BENDABLE LAYERED MATERIALS

[75] Inventor: Cornell Candea, Clawson, Mich.

[73] Assignee: Chrysler Corporation, Highland Park, Mich.

[21] Appl. No.: 448,381

[22] Filed: Dec. 11, 1989

[51] Int. Cl.⁵ .............................................. B23P 17/00
[52] U.S. Cl. .................................... 29/425; 29/525.1; 264/339
[58] Field of Search ............... 29/525.1, 525.2, 425; 403/408.1; 264/242, 295, 339; 72/335, 379, 324

[56] References Cited

U.S. PATENT DOCUMENTS

| | | | |
|---|---|---|---|
| 2,751,664 | 6/1956 | Arnit | 72/379 |
| 3,006,443 | 10/1961 | Siler | 403/408.1 |
| 3,158,045 | 11/1964 | Siler | 403/408.1 |
| 3,238,900 | 3/1966 | Kendall | 72/379 |
| 3,580,040 | 5/1971 | Lang | 72/324 |
| 4,577,888 | 5/1986 | Takada | 280/808 |

Primary Examiner—Joseph M. Gorski
Assistant Examiner—S. Thomas Hughes
Attorney, Agent, or Firm—Kenneth H. MacLean, Jr.

[57] ABSTRACT

A method of forming a circular opening in a layered sheet material to be subsequently bent which causes the layers to shift relative to one another in a direction normal to the bend including the steps of piercing the layers material with an oblong opening the spaced apart circular end configurations, then bending the layered material so that the opposite end portions in different layers are moved toward one another sufficiently so that a final circular opening is formed.

2 Claims, 1 Drawing Sheet

FORMING BORES IN BENDABLE LAYERED MATERIALS

BACKGROUND OF THE INVENTION

Field of Invention

This application concerns a procedure or method to produce a circular bore for a fastener or the like in laminated or layered sheet material which is first pierced to form an opening and subsequently bent in a shaping operation, the bending causing a relative shift between layers and distortion of the opening.

In the automobile industry, there has been a relatively recent recognition of the advantages in using laminated sheet material for various parts of the vehicle. For example, laminated or layered sheet material can be used for parts such as an engine oil pan to produce desirable noise dampening properties. Other potential applications include valve covers, air cleaner housings and various covers or shields.

Openings are formed in the above mentioned parts during a blanking operation in which a desired pre-bent shape is struck out from flat sheet material. Conveniently, the openings are formed at the same time. Subsequently, the flat part is shaped into a desired configuration by bending of the sheet material. When laminated or layered materials are bent, the layers are shifted relative to one another. With a simple straight bend, the shifting is in a direction substantially normal to the bend. If a circular opening is first formed in the laminated material, subsequent bending will shift the layers and produce a non-circular opening. If the layers are shifted enough, the resultant opening in the material could disappear.

Therefore, it is desirable to form openings in flat laminated sheet material which are so configured so that after a bend is made, a circular opening is produced in spite of shifting between the layers.

A search was conducted on this procedure and the following prior references were uncovered. Although it is not believed that any of the following patents are particularly relevant either taken alone or in combination, they are the closest prior art known to applicant.

The U.S. Pat. No. 2,751,664 to Arnit discloses a non-laminated sheet material product which starts with an irregular opening and bends the material in two closely spaced bends to trap a ball between the material in the opening.

The U.S. Pat. Nos. 3,006,443 and 3,158,045 to Siler disclose layered structures with offset bores and eccentric special fasteners therefore.

The U.S. Pat. No. 3,580,040 to Lang discloses tooling for forming openings in non-laminated sheet material.

The U.S. Pat. No. 3,238,909 discloses an optical system to correct distortions using pre-printed copy on flat stock. The U.S. Pat. No. 4,577,888 discloses a seat belt anchor formed from two overlying straps (see FIGS. 7 and 8). One of the straps has oblong shaped openings therethrough.

SUMMARY OF THE INVENTION

This application concerns a procedure or method for forming an opening in a laminated sheet when in an initial flat form in such a manner so that after a subsequent bending, the opening is circular despite shifting between the layers as caused by the bending of the material.

The subject method of forming circular openings in subsequently shaped laminated material has further objects and other advantageous applications which will be even more apparent after a reading of the following detailed description of the method and a product to which it applies, reference being made to the drawings as described below.

DETAILED DESCRIPTION OF AN EMBODIMENT

In the eight FIGS. 1A-4B, a portion 10 of a three layer laminated sheet material is shown. Specifically, the material 10 has two outer layers 12 and 14 and an inner layer 16. Preferably, the outer layers 12, 14 are of steel and the inner layer 16 is of elastomeric material. This combination is particularly effective for noise dampening in an engine. Alternately, the use of a two layer structure, either two steel sheets or a steel and a plastic sheet are known and used. The subject procedure or method is applicable to either two more layered laminated materials.

Figure 1A:
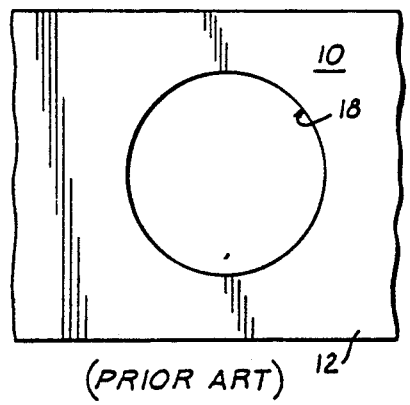
FIGS. 1A is a planar view and FIGS. 1B is a sectioned elevational view of a prior art laminated material in the flat with a circular opening formed therethrough.
Figure 2A:
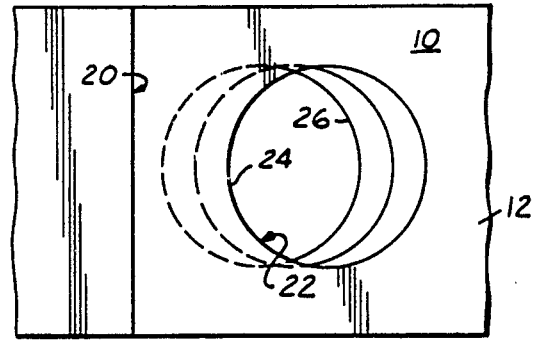
FIGS. 2A is a planar view and FIG. 2B is a sectioned elevational view of the undesirable result on the circular opening from bending the flat material of FIGS. 1A and 1B.
Figure 1B:
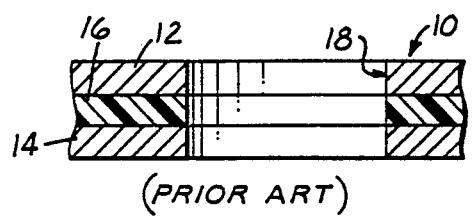
Figure 2B:
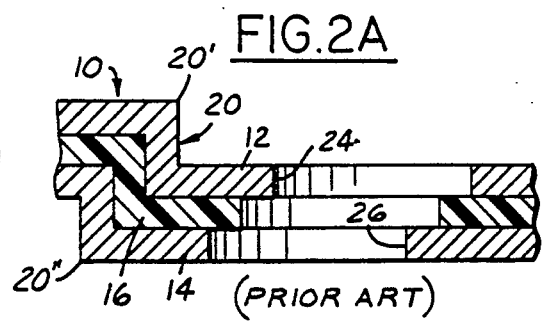

FIGS. 1A and 1B represent a prior art structure including a three layered laminated material 10 in the initial flat shape. For simplicity, material 10 is shown in the form of a portion of a elongated strap or the like. A circular bore or opening 18 is formed in the flat material and extends through the three layers 12, 14 and 16. FIGS. 2A and 2B show the results to the prior art structure when the flat material 10 is bent during a shaping operation. Specifically, the material has been shaped into a non-planer offset 20 by forming double bends 20' and 20''. When laminated material is so bent, the layers 12, 14 and 16 slip or shift with respect to each other. This results in a shift between the openings 18 in the three layers as is evident from FIGS. 2A and 2B. Accordingly, as seen in FIG. 2A the original circular opening through the layers has been transformed into a non-circular through opening 22 formed between the leftward portion 24 of opening 18 in the layer 12 and the rightward portion 26 of opening 18 in the layer 14. This non-circular opening 22 is useless except for specially designed fasteners as previously disclosed in the Siler patents.

Figure 3A:
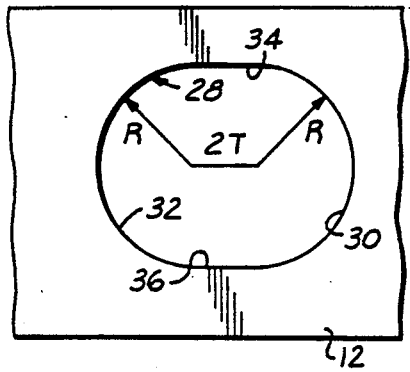
FIGS. 3A is a planar view and FIG. 3B is a sectioned elevational view of a laminated material in the flat with an oblong opening formed therein corresponding to the method taught in this application.
Figure 3B:
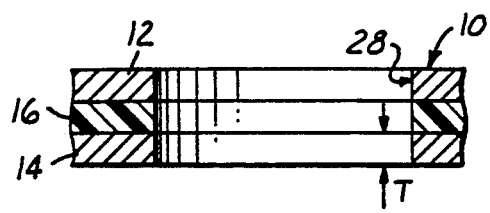

FIGS. 3A and 3B show the three layer laminated structure in the flat but in accord with the teachings of the subject application. Instead of the circular opening shown in the earlier views, a non-circular or oblong opening 28 is formed through the material 10. As best understood by reference to FIG. 3A, the oblong opening 28 is formed by oppositely positioned circular end portions 30 and 32 having a radius R which are connected by side portions 34 and 36. The end portions 30, 32 are aligned right to left in FIG. 3A in a direction A. Direction A extends substantially normal to the ends shown in FIGS. 4A and 4B.

Figure 4A:
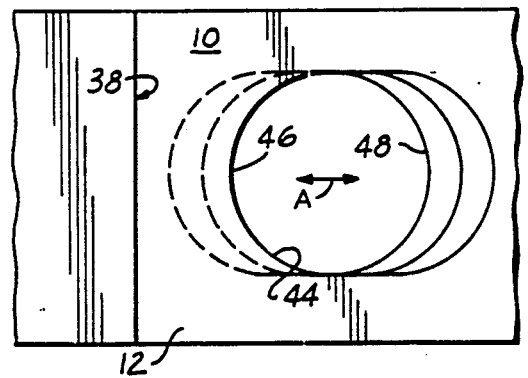
FIGS. 4A is a planar view and FIG. 4B is a sectioned elevational view of the desirable result on the oblong opening from bending the flat material of FIGS. 3A and 3b.
Figure 4B:
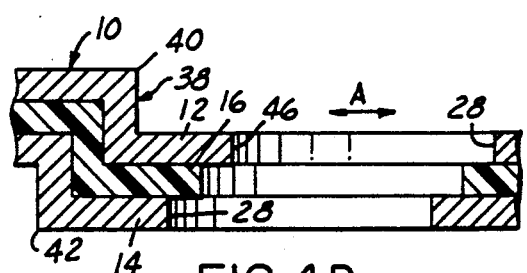

An offset shaped structure 38, like the offset structure of FIGS. 2A and 2B, is shown in FIGS. 4A and 4B. The offset 38 is formed by two bends 40 and 42. The layers 12, 14 and 16 shift in the direction A relative to one another as previously observed and as is evident from FIG. 4B. The shifting causes the original oblong opening through the material 10 to be transformed into a circular opening 44 as best seen in FIG. 4A. Specifically, the leftward portion 46 of layer 12 and the rightward portion 48 of the layer 14 define a circular opening 44 which is useful to accept a standard cylindrical fastener or the like (not shown).

From the previous description, the method or the procedure for forming final circular openings in a laminated part which is subjected to a bending operation after formation of the initial opening is quite clear. First, a laminated structure is pierced to form an oblong opening with spaced circular end portions. Then, bending of the structure is performed causing the layers to shift a predictable degree so that the right and left end portions of opposite outer layers are shifted toward one another sufficiently so that a circular through opening is formed looking in the plane direction.

In FIG. 3B, the laminated material includes three equally thick layers with thickness T. In FIG. 3A, the oblong opening 28 is shown with two equal radii R for the end portions 30, 32. The end portions are spaced apart a distance 2T as shown in FIG. 3A. From this it is easy to see that the length of the major axis of the oblong opening is equal to $2T + 2R$. By experience, applicant has found that this dimension represents the maximum extent of the shift to be expected. Of course, the shift dimension is dependent upon the materials used in the laminate as well as the absolute value of the thickness. The degree or extent of the bend would also influence the shifting and this dimension. In two layer laminates with thin sheet steel in each layer, a shift of only $\frac{1}{2}$ T has been observed.

The structure and the procedure or method of forming a circular opening in a laminate which is then bent subsequently to forming the opening is not to be limited by the specific examples or description above but to be defined by a reasonable construction of the following claims which describe the invention.

I claim:

1. A method of forming an opening in layered sheet material to be subsequently bent by which the layers are shifted relative to one another in a direction normal to the bend, so that a port-bend circular opening with a desired radius is finally produced to receive a cylindrical fastener, comprising: piercing the layered material thereby forming an oblong pre-bend opening which has circular end configurations each with a center point and substantially the same shape as the desired post-bend circular opening, a line extending through the center points of the circular end configurations being aligned in a direction normal to the subsequent bend and with the center points spaced from one another a distance related to the shift caused by the bend bending the layered material along a line substantially normal to a line through the center points of the end configurations, thereby shifting the layers relative to one another in the direction normal to the bend sufficiently so that opposite end configurations in different layers move toward one another a circular opening through the shifted layered material.

2. With a layered laminated sheet material in which shifting of the layers relative to one another in a planar direction takes place when the material is bent, a method of providing an opening therethrough which after bending of the laminated material attains a desired circular through configuration, comprising: piercing the laminated material, thereby forming an oblong pre-bend opening with circular end configurations each with a center point and a radius substantially the same as the desired post-bend circular through configuration, a line extending through the center points of the circular end openings being aligned in a direction normal to the subsequent bend and with the center points spaced from one another sufficiently to accommodate the shifting resulting from the bend; bending the laminated material along a line substantially normal to the line through the center points of the end configurations, thereby shifting the layers relative to one another shifting of layers sufficiently so that opposite end configurations in different layers move toward one another, thereby forming a circular opening through the layered material.

* * * * *